(No Model.)
D. B. MATLOCK.
FENCE.
No. 385,467.  Patented July 3, 1888.
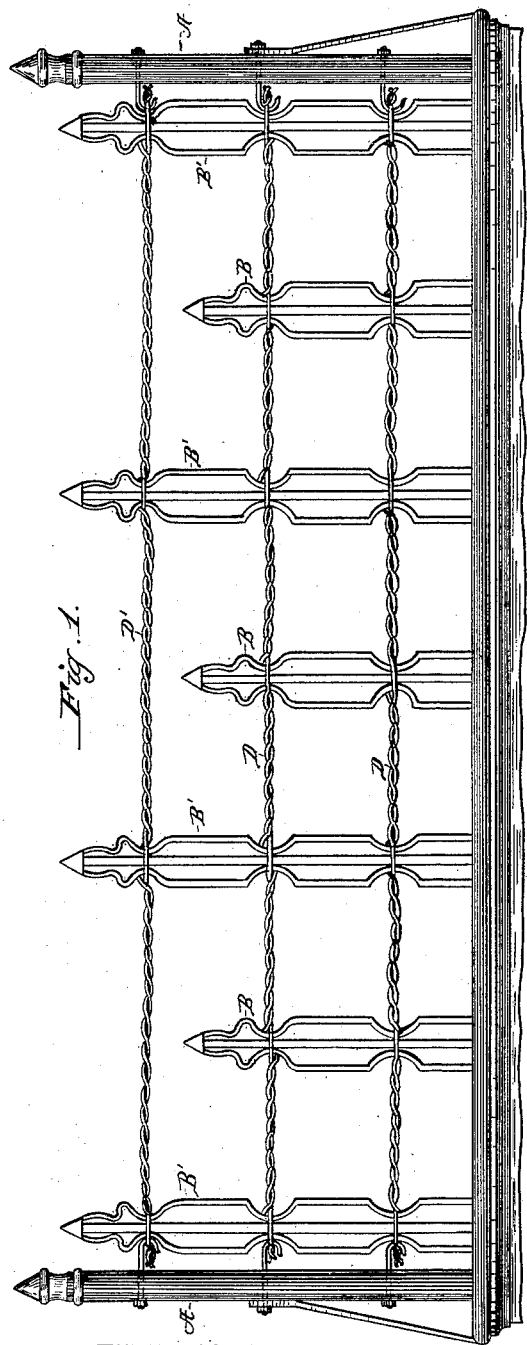
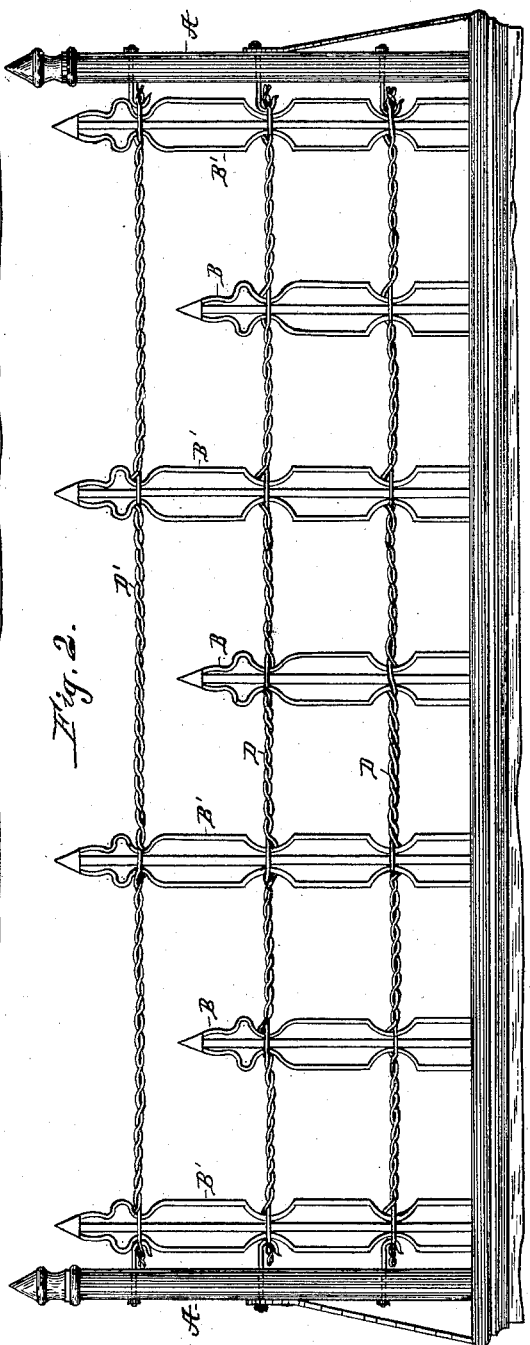
WITNESSES,
P. N. Hale.
Geo. R. Byington.
INVENTOR,
David B. Matlock
per Hallock and Hallock.
Attorneys.

UNITED STATES PATENT OFFICE.

DAVID B. MATLOCK, OF SAN JOSÉ, CALIFORNIA.

FENCE.

SPECIFICATION forming part of Letters Patent No. 385,467, dated July 3, 1888.

Original application filed March 3, 1887, Serial No. 229,652. Divided and this application filed May 16, 1888. Serial No. 274,042.

(No model.)

*To all whom it may concern:*

Be it known that I, DAVID B. MATLOCK, a citizen of the United States, residing at San José, in the county of Santa Clara and State of California, have invented certain new and useful Improvements in Fences; and I do hereby declare the following to be a full, clear, and exact description of the invention, such as will enable others skilled in the art to which it appertains to make and use the same.

My invention relates to that class of fences which are constructed by weaving pickets between wires or by twisting wire around pickets. Heretofore in making this class of fences the pickets inserted between the twisted wires were of substantially the same length. While such fences are useful, and to a certain extent ornamental, they are not sufficiently ornamental to use in places where better effects are necessary. This is due to the fact that machines used in making the fences have been so constructed that long and short pickets could not be used in the same fence, as the wires between the long pickets and above the short pickets would not be twisted to the same degree as those which held the long and short pickets.

Prior to my invention, so far as I am aware, no one has ever succeeded in making a wire-and-picket fence having pickets of different lengths held in place by twisted wires. I am aware that fences having pickets of different sizes have been interlaced between wires stretched between posts; but such fences differ from mine in that there is nothing to support the pickets when the wires expand by reason of the heat to which fences are exposed, and unless the fence is constantly attended to the varying conditions of the temperature will soon destroy the sustaining power of the wires, and the pickets would then fall from their normal position. In my fence the wires between the pickets are twisted, so that any expansion of the wires will not materially interfere with the grasping and permanent holding of the pickets.

My invention therefore consists of constructions and combinations, all as will hereinafter be described in the specification and pointed out in the claims, reference being had to the accompanying drawings, in which—

Figure 1 represents a side elevation of a fence; Fig. 2, a similar elevation showing the wires twisted in a different manner from the fence shown in Fig. 1.

A represents the posts separating the panels; B, the short pickets; B', the long pickets; D, the wires binding all the pickets, and D' the wires binding the upper part of the long pickets.

My fence may be made upon what is termed a "house" loom or machine, upon which the panels are first made and then set up in the field, or by a field machine, which makes the fence in the field and sets it up at the same time. Owing to the fact that the upper wires do not bind the short pickets, I arrange the gearing of the machine in such way that the "heads" which twist the upper wires will revolve faster than the heads which twist the wires between the long and short pickets. This is necessary, as the upper wires are not twisted around as many pickets as the wires below it. The number of extra twists given to the upper wires is regulated, of course, by the number of intermediate or smaller pickets between the longer pickets. In the example shown in Fig. 1 the number of twists in the upper wire would be from one-third to one-fourth greater than the twists between the long and short pickets.

In case the machine desired to be used cannot be made to increase the twist in the upper wires, the defect can be overcome by using larger wire, as a given number of twists of large wire will take up more space than an equal number of twists in smaller wire.

In practicing my invention I propose to use any of the well-known fence-machines. The twists in these machines vary—some twist uniformly from end to end of the fence, and others reverse the twist between the pickets. In my fence, if I desire to reverse the twist, the reversal is only made between the long pickets, unless the head of the upper wires be operated separately from the other heads, which is not apt to be the case.

In Fig. 1, I show the wires wound continuously from end to end, and in Fig. 2 reversely twisted between the longest pickets.

In application No. 229,652, filed March 3, 1887, of which this is a division, I show another form of fence; but I prefer the form shown and described in this application.

What I claim as new is—

1. A fence formed of long and short pickets held together by twisted wires, and the long pickets connected together above the short pickets by twisted wires.

2. A fence formed of long and short pickets held together by twisted wires, the long pickets being connected by twisted wires above the short pickets and all the wires reversely twisted between the long pickets.

DAVID B. MATLOCK.

Witnesses:
CHAS. E. ALLEN,
GEO. M. YOELL.